United States Patent [19]
Mol et al.

[11] Patent Number: 6,140,522
[45] Date of Patent: Oct. 31, 2000

[54] METHOD FOR ALTERING THE RATIO OF ISOTOPES OF THE METAL OF A METAL ALKYL

[75] Inventors: Charles Adelbert Mol, Almelo; Maarten van Wijnkoop, Deventer, both of Netherlands

[73] Assignee: Urenco Nederland B.V., Netherlands

[21] Appl. No.: 09/477,802

[22] Filed: Jan. 5, 2000

[30] Foreign Application Priority Data

Jan. 5, 1999 [NL] Netherlands ............................ 1010958

[51] Int. Cl.⁷ ...................................................... C07F 3/06
[52] U.S. Cl. ............................................................. 556/129
[58] Field of Search ............................................... 556/129

[56] References Cited

FOREIGN PATENT DOCUMENTS

WO 96/06670  3/1996  WIPO .

*Primary Examiner*—Porfirio Nazario-Gonzalez
*Attorney, Agent, or Firm*—Pillsbury Madison & Sutro LLP

[57] ABSTRACT

A method for altering the ratio of isotopes of the metal of a metal alkyl, in that an amount of depleted or enriched metal alkyl in preferably liquid form is contacted with an amount of the metal of the metal alkyl or an alloy of that metal and is held in contact for some time. Preferably, particulate metal or alloy is used, and the metal alkyl and the metal or the alloy are contacted and held in contact at a temperature above room temperature. The metal alkyl and/or the metal or alloy can be moved while being held in contact. The method is applicable in particular to diethylzinc and zinc.

8 Claims, No Drawings

METHOD FOR ALTERING THE RATIO OF ISOTOPES OF THE METAL OF A METAL ALKYL

This invention relates to a method for altering the ratio of isotopes of the metal of a metal alkyl.

The different elements which occur in nature consist for the majority of a mixture of different isotopes. While the mutual ratio of those isotopes is always the same. Different isotopes of an element exhibit the same chemical properties. The differences essentially consist only in deviations from the atomic mass, because the numbers of neutrons in the atomic nuclei in question are different.

There are applications in which exclusively one particular isotope may be used, so that all other isotopes must be removed from a starting material as far as possible. Such removal is done with a separation process. The product, material with an excess of the one desired isotope, is called enriched. There are also applications in which only one isotope needs to be removed. The material is then referred to as depleted material. There are different industrial separation processes. An example is separation by means of ultracentrifuges.

In separating isotopes by means of ultracentrifuges, it is required to have gaseous material at one's disposal in which the isotopes to be separated are contained. Many elements to which isotope separation is to be applied, however, cannot, or cannot easily, be brought into the gaseous form, so that (for instance in the case of metal isotopes to be separated) often use is made of a chemical compound of the material to be separated. In the case of metal, use is then sometimes made of a metal alkyl. A metal alkyl is usually easier to bring into the gaseous condition than the metal itself.

In practice, the feedstock, in the present case a metal alkyl having a natural isotope composition, is passed into a separation plant, which subsequently produces a stream of enriched metal alkyl and a stream of depleted metal alkyl. The stream which it is desired to obtain is called the product, and the residual stream is called the waste stream. Thus, depending on the desired product, the waste stream is a stream of enriched material or a stream of depleted material. Usually, there is no utility for such a waste stream, which is then to be discharged and destroyed. This can lead to problems. Some metal alkyls can only be destroyed in a laborious manner.

It would be advantageous if a waste stream could be processed so as to yield a product which in turn can serve as a basis for a separation operation. This is especially advantageous in cases where such a starting material is rather costly.

The object of the invention, presently, is to provide a method by means of which the ratio of isotopes in a product with a ratio of isotopes deviating from the natural ratio is altered in the direction of the natural ratio.

The stated object is achieved, according to the invention, with a method in which an amount of depleted or enriched metal alkyl in preferably liquid form is contacted with an amount of the metal of the metal alkyl or an alloy of the metal of the metal alkyl and is held in contact for some time.

It was found that if an amount of liquid or gaseous metal alkyl is held in contact for some time with an amount of metal of the alkyl or alloy of the metal of the alkyl, an exchange of metal ions occurs between the metal alkyl and the metal or the alloy, so that the ratio of isotopes of the metal in the alkyl shifts in the direction of the isotopic composition of the metal or the metal in the alloy. Accordingly, if one starts from an excess of the metal in the natural composition, which may or may not be in the form of an alloy, then in the course of time the isotopic composition of the metal in the metal alkyl is going to approximate the natural composition. Thus, a waste stream can be converted into an amount of the starting material, so that it can be utilized for a next separation operation.

Preferably, in the method according to the invention, particulate metal or metal alloy is used. It has been found that the use of particulate metal leads to better results.

Preferably, further, in the method according to the invention, the metal alkyl and the metal or the alloy are contacted and held in contact with each other at a temperature above room temperature. It has been found that the exchange of the metal ions proceeds more rapidly at an increased temperature.

It has further been found that the exchange of metal ions also proceeds faster if the metal alkyl and/or the metal or the alloy are moved while being held in contact.

The method according to the invention can be suitably applied to diethylzinc, in which case the diethylzinc is contacted with zinc or a zinc alloy. In a suitable manner, a temperature between 20 and 110° C., and preferably a temperature of at least 50° C., is then used. Good results are then achieved if zinc is used in powder form of a particle size of 7 μm or less. The method is highly suited to be used for altering the ratio of isotopes of zinc in diethylzinc, enriched in $^{64}$Zn, in the direction of the natural composition.

As may be assumed to be known, natural zinc contains five isotopes in the following ratio:

$^{64}$Zn 48.6%
$^{66}$Zn 27.9%
$^{67}$Zn 4.1%
$^{68}$Zn 18.8%
$^{70}$Zn 0.6%

A number of, often medical, applications are known for enriched $^{68}$Zn and for enriched $^{70}$Zn, but there is also a demand for depleted $^{64}$Zn. This latter type is used as additive for the cooling system in nuclear plants.

The isotopes to be separated cannot be passed directly into an ultracentrifuge, since the ultracentrifuge works with gas, and zinc is a solid under normal conditions. Therefore, use is made of a chemical compound of zinc, which has a low boiling point and hence is easy to made gaseous. Such a chemical compound is diethylzinc, also referred to as DEZ. In practice, the feedstock, DEZ of natural isotopic composition, is passed into the separation plant, which subsequently produces an enriched stream of DEZ and a depleted stream of DEZ. In the case of $^{64}$Zn, it is desired to obtain depleted $^{64}$Zn, and the enriched stream is the waste stream. This waste stream is significantly larger (up to about 5 times) than the product stream. The waste stream is further not useful and is to be discharged and destroyed. This is not simple, for DEZ is pyrophoric (combusts spontaneously upon contact with air). To destroy DEZ, it must first be diluted with a large amount of solvent before it can be controllably burnt. Further, the feedstock is rather costly.

By the use of the method according to the invention, the waste can be reused. In an experiment, finely divided metallic zinc of natural composition was brought together with liquid DEZ whose isotopic composition had been altered. The mixture was stored at a temperature of 50° C. for a number of days and subsequently the isotopic composition of the DEZ was measured. It was found to have shifted markedly in the direction of the natural composition. A second measurement after a further number of days showed a still further alteration. This shows that the zinc atoms of the metal particles changes places with those of the DEZ.

Further investigation moreover showed that if the contact between the DEZ and the zinc particles is intensified, for instance through movement of the mixture, the exchange of metal atoms/metal ions proceeds faster.

The method according to the invention can be suitably carried out in a so-called flow process. If DEZ is used, for instance liquid DEZ of altered isotopic composition can be allowed to flow slowly through a number of reactors each having a bed of zinc particles of a natural isotopic composition.

The invention is elucidated in and by the following examples.

EXAMPLE I

A 75 ml container was filled in a so-called glovebox with 12.4 g of powder of natural zinc (mw=65.38; 0.19 mole). The container was closed under nitrogen, cooled in liquid nitrogen and pumped off. Subsequently, 3.4 g of diethylzinc (DEZ) (mw=125.3; 0.027 mole) depleted in $^{64}$Zn (6.09%) was frozen over in the container. After the container had been held, unstirred, at room temperature for about 72 hours, a mass spectrum was recorded to determine the $^{64}$Zn concentration. It was 6.41%. Because this concentration hardly differed from the initial concentration, it was decided to raise the temperature. After 240 hours, 17 days, and 31 days, respectively, at 50° C. without stirring, the $^{64}$Zn concentration was measured. The results are presented in Table A. For each isotope measurement, 0.3–1 g of the DEZ present was used up.

EXAMPLE II

A 75 ml container was filled in the glovebox with 35 g of powder of natural zinc (mw=65.38; 0.535 mole). The container was closed under nitrogen, cooled in liquid nitrogen and pumped off. Subsequently, 10.51 g of DEZ (mw=125.3; 0.0839 mole) depleted in $^{64}$Zn (5.81%) was frozen over in the container. After the container has been held, unstirred, at 20° C. for about 25 hours, a mass spectrum was recorded to determine the $^{64}$Zn concentration. It was 5.89%. The container was then placed in an oven and held at 70° C. After 46, 134.5, 199.5, 287.8 and 352.3 hours, respectively, the $^{64}$Zn concentration was measured. The results are presented in Table A. For each isotope measurement, 0.3–1 g of the DEZ present was used up.

EXAMPLE III

A 75 ml container was filled in the glovebox with 35 g of powder of natural zinc (mw=65.38; 0.535 mole). The container was closed under nitrogen, cooled in liquid nitrogen and pumped off. Subsequently, 8.96 g of DEZ (mw=125.3; 0.0715 mole) depleted in $^{64}$Zn (5.86%) was frozen over in the container. After the container had been held, unstirred, at 20° C. for about 74 hours, a mass spectrum was recorded to determine the $^{64}$Zn concentration. It was 6.15%. The container was then placed in an oven and continuously rolled at a temperature of 70° C. After 88.5, 154.5, 220.0 and 284.5 hours, respectively, the $^{64}$Zn concentration was measured. The results are represented in Table A. For each isotope measurement, 0.3–1 g of the DEZ present was used up. In taking the samples for those measurements, some problems occurred. In the first sampling after 88.5 hours, the container could not be properly pumped off as a result of the fact that the cock of the bottle-shaped container was completely clogged with agglomerated zinc (powder). This material was packed to such an extent that almost a metal bar was involved. To remove it, the container, while cold, was pumped off and a different cock was mounted on it. The consequence was that the initial ratio of zinc powder to DEZ had perhaps changed. The subsequent measurements also proceeded laboriously. Nonetheless, it was possible to determine the isotopic composition of the DEZ.

TABLE A

| Example I (50° C., static) t (days), $^{64}$Zn (%) DEZ | | Example II (70° C., static) t (hours), $^{64}$Zn (%) DEZ | | Example III (70° C., rolled) t (hours), $^{64}$Zn (%) DEZ | |
| --- | --- | --- | --- | --- | --- |
| 0 | 6.09 | 0 | 5.89 | 0 | 6.15 |
| 10 | 18.6 | 46 | 9.35 | 88.5 | 20.12 |
| 17 | 25.38 | 134.5 | 18.40 | 154.5 | 30.40 |
| 31 | 33.18 | 199.5 | 25.24 | 220.0 | 34.24 |
|  |  | 287.8 | 30.52 | 284.5 | 36.22 |
|  |  | 352.3 | 33.90 | 735.7 | 40.53 |
|  |  | 803.5 | 40.08 |  |  |

What is claimed is:

1. A method for altering the ratio of isotopes of the metal of a metal alkyl, characterized in that an amount of depleted or enriched metal alkyl in preferably liquid form is contacted with an amount of the metal of the metal alkyl or an alloy of the metal of the metal alkyl and is held in contact for some time.

2. A method according to claim 1, characterized in that particulate metal or metal alloy is used.

3. A method according to claims 1–2, characterized in that the metal alkyl and the metal or the alloy are contacted and held in contact with each other at a temperature above room temperature.

4. A method according to claim 1, characterized in that the metal alkyl and/or the metal or the alloy is/are moved while being held in contact.

5. A method according to claim 1, characterized in that when using diethylzinc and zinc, a temperature between 20 and 110° C. is used.

6. A method according to claim 5, characterized in that a temperature of at least 50° C. is used.

7. A method according to claims 5–6, characterized in that zinc in powder form of a particle size of 7 μm or less is used.

8. A method according to claim 5, characterized in that diethylzinc enriched in $^{64}$Zn is used.

* * * * *